April 21, 1959 B. F. WILEY ET AL 2,882,914
DETECTION OF AN ELECTROLYTE LIQUID IN A STREAM OF NON-CONDUCTIVE, NON-ELECTROLYTE LIQUID
Filed July 7, 1955
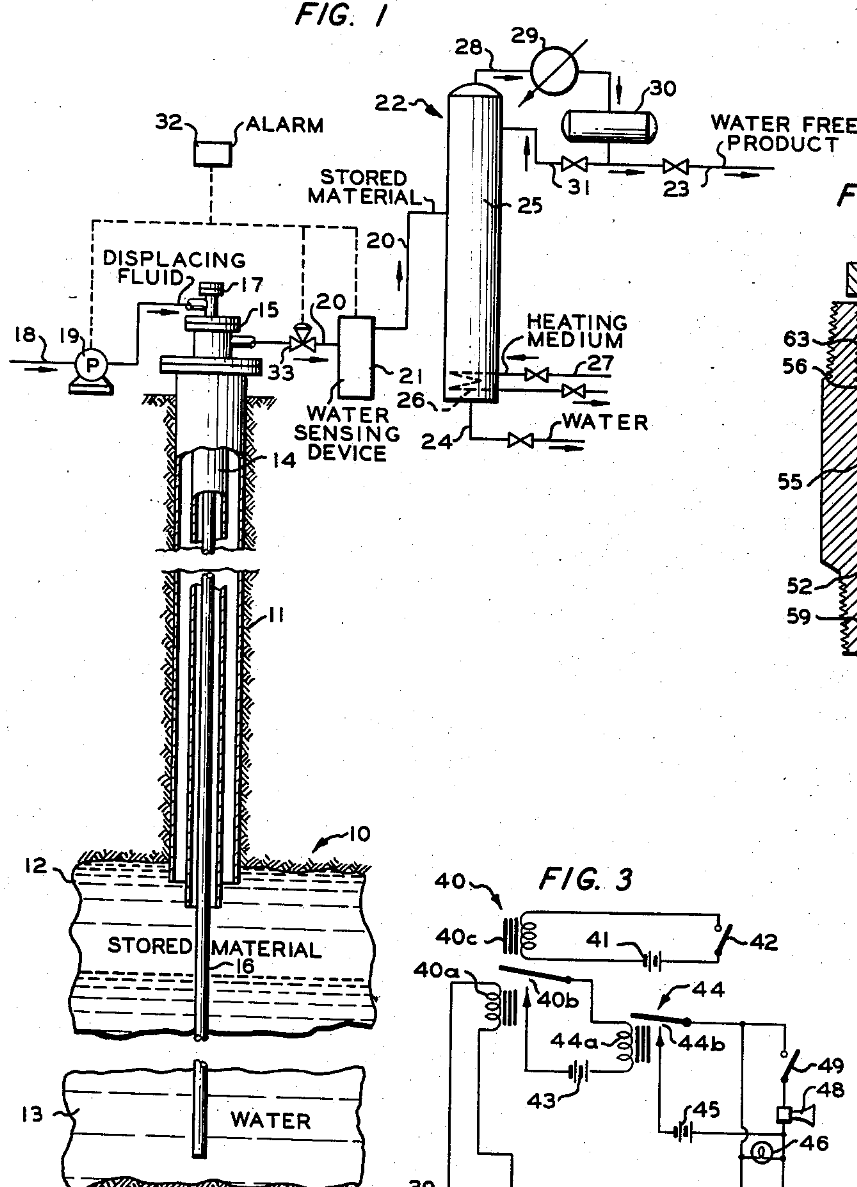
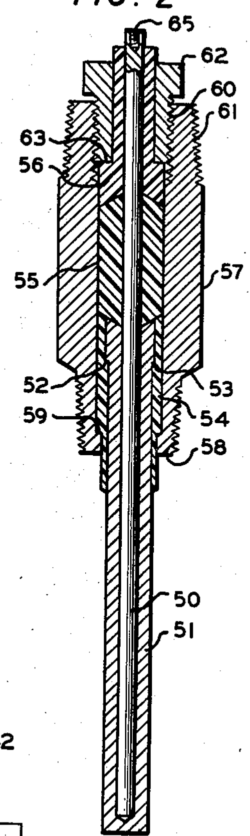
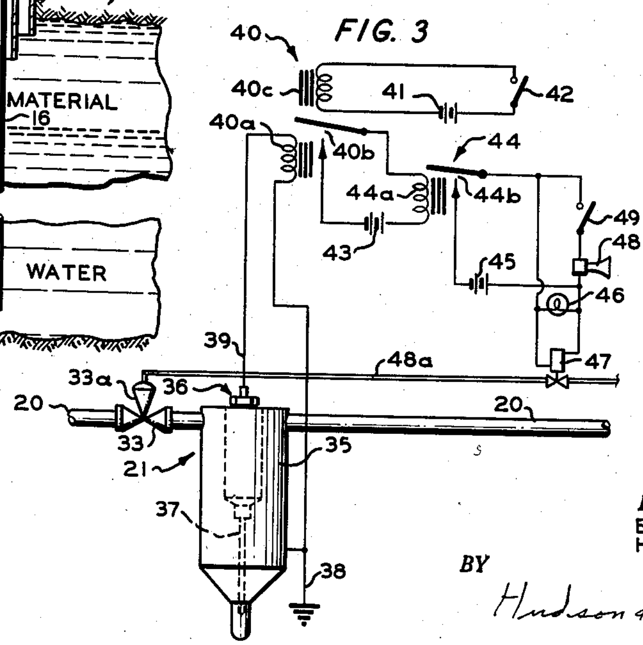
INVENTORS
B. F. WILEY
H. M. BARTON, JR.
BY Hudson & Young
ATTORNEYS United States Patent Office 2,882,914
Patented Apr. 21, 1959

2,882,914

DETECTION OF AN ELECTROLYTE LIQUID IN A STREAM OF NON-CONDUCTIVE, NON-ELECTROLYTE LIQUID

Bruce F. Wiley and Hugh M. Barton, Jr., Bartlesville, Okla., assignors to Phillips Petroleum Company, a corporation of Delaware Application July 7, 1955, Serial No. 520,470

13 Claims. (Cl. 137—2)

This invention relates to the detection of an electrolyte liquid in a stream of non-conductive, non-electrolyte liquid, In another aspect, it relates to an underground storage system. In still another aspect, it relates to a probe for producing an electrical output indicating the presence of an electrolyte material in a stream of non-conductive, non-electrolyte material.

In many commercial processes, the presence of a free electrolyte liquid, such as water, in a non-conductive, non-electrolyte liquid stream, such as a hydrocarbon stream, is extremely troublesome. In particular, there may be mentioned water contamination of butane or butylene feed to a dehydrogenation unit, furfural-containing streams in extractive distillation units, sulfur dioxide extract streams, and propylene streams. A particularly serious problem is encountered in underground storage installations where materials, such as propane or ammonia, are stored in underground cavities at periods of light demand and withdrawn from storage during periods of heavy demand.

In such systems, a separation system is provided to separate water from the stored ammonia or propane, and this separation system is seriously overloaded when slugs of water are discharged from storage along with the propane.

In accordance with this invention, a very sensitive system is provided for the detection of small amounts of electrolyte materials, such as water, in non-conductive, non-electrolyte streams, such as hydrocarbon streams. This is done by inserting into a metal conduit, preferably at an enlarged portion thereof, a probe having an element or member formed of a metal dissimilar from the metal of the conduit. When free electrolyte material is present, a potential is developed between the metal of the probe and the metal of the conduit, and the resulting potential is caused, by the action of a sensitive relay system, to actuate an indicating device or an automatic control system stopping the flow of the electrolyte material bearing stream through the conduit. In this connection, we have devised a probe of sturdy construction wherein a metal shell of relatively weak material is mounted upon a rod of a relatively strong metal, with a novel clamping and insulating system to maintain the metal sleeve in assembled relation upon the rod. Finally, we have provided a system utilizing the aforementioned probe and relay means which prevents overloading of water removal facilities in an underground storage system for materials such as propane or ammonia.

Accordingly, it is an object of the invention to provide an improved system for the detection of free electrolyte liquids in a stream of non-conductive, non-electrolyte liquids.

It is a further object to provide an improved underground storage system wherein overloading of the water separation facilities is avoided.

It is a still further object to provide a probe of novel construction adapted for use in the aforementioned system.

Various other objects, advantages and features of the invention will become apparent from the following detailed description taken in conjunction with the accompanying drawings, in which:

Figure 1 is a view of an underground storage system embodying the detector system of our invention;

Figure 2 is a vertical sectional view of a probe constructed in accordance with the invention; and Figure 3 is a schematic circuit diagram of the detector and relay system.

Referring now to Figure 1, we have shown an underground storage system including a subterranean cavity 10 connected to the surface by a vertical shaft 11. In the example shown, the stored material is liquefied petroleum gas or propane, indicated by reference numeral 12, and a heavier displacement medium 13, such as water. It will be apparent, however, that the invention is applicable to the use of other stored non-conductive, non-electrolyte materials, such as ammonia, gasoline, oil and the like. The material can be withdrawn from storage in any suitable manner.

In the present example, there is provided in the shaft 11 a casing 14 suspended from a casing head 15, and a string of tubing 16 is supported interiorly of the casing by a tubing head 17.

The displacing medium, water, is fed through a line 18, a pump 19, and the tubing 16 to the bottom of the cavity 10, and such flow of water displaces propane through the casing 14, casing head 15 and a valved line 20 to a novel water sensing device 21 from which the material withdrawn from storage passes to a separator system 22, wherein a water-free product is withdrawn by a line 23 and the water is withdrawn by a line 24.

In the example shown, the separation system 22 includes a fractionation column 25 having a coil 26 through which a heating medium, such as steam, is introduced through a valved line 27. The water is withdrawn from the kettle through the line 24, while the water-free propane passes overhead through a line 28, and a condenser 29 to an accumulator 30, part of the condensate being returned to the top of the column as reflux through a line 31 and the rest being withdrawn through the line 23.

When a slug of water is withdrawn with the propane, the sensing device 21 produces an output which is utilized to actuate an alarm 32 and also, if desired, to actuate a motor valve 33 in the line 20 to cut off the supply of propane to the fractionator, and thus prevent overloading thereof until the condition is remedied causing the presence of the water. This same effect can be produced by connecting the output of the sensing device 21 to the pump 19 to stop operation thereof when the water contaminated propane starts to pass to the fractionator 25. In either event, overloading of the separation facilities is prevented, as is presence of more than specified amounts of water in the withdrawn product.

In Figure 3, the sensing device 21 and its associated electrical circuitry is shown in more detail. In this figure, it will be noted that the line 20 through which the water-contaminated propane is fed, has an enlarged portion or sump 35, the walls of which are formed from a metal, such as steel. It will be understood that the water-propane mixture is described purely for purposes of illustration, and that the system of Figure 3 can be used with various non-conductive, non-electrolyte liquid streams, such as hydrocarbon streams, which may be contaminated with free electrolyte liquids, such as water. For example, the stream passing through the line 20 can be a butane fraction fed to a butane dehydrogenation step, or a furfural-containing stream utilized in the extractive distillation of butadiene from more saturated hydrocarbons containing four carbon atoms.

Protruding into the enlarged portion 35 is a probe 36 which has a portion 37 of a metal dissimilar from that of the enlarged portion or sump 35. In particular, where the portion 35 is formed from steel, the metal portion or member 37 can advantageously be formed from magnesium. When no electrolyte material is present, no potential is developed between the probe and conduit. However, when an electrolyte material is present, a potential is developed as a result of the differing contact potentials of the two metals. In particular, this potential is developed betweeen the metal part of the line, which is grounded at 38, and a lead 39 connected to the metal member 37.

This potential is applied through the leads 38, 39 to an operating winding 40*a* of a sensitive relay 40 which has a set 40*b* of normally open contacts and a reset winding 40*c* which is connected in circuit with a battery or other current source 41 and a reset switch 42.

The contacts 40*b* are connected in circuit with a battery 43 or other current source and an operating winding 44*a* of a relay 44 having a set 44*b* of normally open contacts.

The contacts 44*b* are, in turn, connected in circuit with a battery or other current source 45. This circuit, in turn, is connected in parallel with a lamp 46, the operating winding of a solenoid valve 47, and a klaxon horn 48, the horn 48 having a switch 49 connected in series therewith.

The solenoid valve 47 is connected in an air line 48*a* which supplies air to diaphragm chamber 33*a* of the valve 33.

In operation, the presence of electrolyte fluid, such as water, in the stream passing through conduit 20 causes the actuation of the sensitive relay 40 which, in turn, actuates auxiliary relay 44, thus causing an indication of the presence of the water through lighting of lamp 46 and/or sounding of the horn 48, thus indicating that water is present in greater than a predetermined amount in the line 20. Moreover, when relay 44 is actuated, solenoid valve 47 is open thus supplying air to the diaphragm chamber of valve 33 and closing this valve. This stops the flow of fluid through the line 20 until the condition causing the presence of water or other ionic fluid is corrected. After the condition is corrected, relay 40 is reset by manipulation of switch 42 and the system is in readiness for a new cycle of operation.

In Figure 2, we have shown the construction of a suitable probe which can be utilized very advantageously in the system of Figures 1 and 3. This probe includes a central rod 50 of a relatively strong metal, such as carbon steel, and it is surrounded by a shell or sleeve 51 of a relatively weak metal having a contact potential which differs substantially from that of the enlarged conduit portion 35, Figure 3. The rod 50 thus imports structural strength to the probe assembly, an advantageous combination being carbon steel for the rod and magnesium for the sleeve.

It will be noted that the sleeve 51 closes or covers one end of the rod 50. At the other end of the rod, the sleeve 51 is provided with a shoulder 52 which is engaged by a complementary shoulder 53 formed on a sleeve 54 of plastic insulating material. The inner end of the sleeves 51, 54 abut a resilient cylindrical member 55, formed from Teflon or other resilient dielectric material, and the member 55, in turn, abuts a plastic insulating sleeve 56 carried by the rod 50 at the end thereof remote from the magnesium sleeve 51.

Overlying the sleeves 54, 56 and the member 55 is a metal housing 57 having a threaded flanged end portion 58 which abuts a shoulder 59 formed on the insulating sleeve 54. The other end of the member 55 is threaded interiorly at 60 and exteriorly at 61. A packing nut 62 engages the inner threaded portion 60 of the housing 57, and this packing nut engages a shoulder 63 formed on the insulating sleeve 56. This urges the sleeves 51, 54 and 56 into assembled relation upon the inner rod 50.

The rod 50 has a tapped opening 65 by which an electrical connection can be made through the rod 50 to the outer metal sleeve 51.

The probe, therefore, is adapted to be readily mounted in a threaded opening, has a high degree of structural strength, and its parts are readily maintained in assembled relation. Further, the probe presents a large metal surface to the liquid in which it is immersed, making it very sensitive to the presence of electrolyte fluids in non-conductive, non-electrolyte streams.

While the invention has been described in connection with a present, preferred embodiment thereof, it is to be understood that this description is illustrative only and is not intended to limit the invention.

We claim:

1. A probe comprising, in combination, an elongated rod formed from a rigid relatively strong metal, a sleeve fitting over said rod and enclosing one end thereof, said sleeve having a shoulder formed at the other end thereof, a sleeve of insulating material mounted at the other end of said metal sleeve and having a first shoulder complementary to and bearing against the shoulder on said metal sleeve and a second shoulder, a metal housing surrounding said sleeve of insulating material and having a flange engageable by said second shoulder, and a packing nut threaded to said housing to urge the first shoulder on said sleeve of insulating material against the shoulder on said metal sleeve and said second shoulder against said flange, whereby said metal sleeve is maintained in assembled relation on said rod, and means for making an electrical connection to said rod.

2. The probe of claim 1 wherein the center rod is formed from steel and the metal sleeve is formed from magnesium.

3. A system for detecting contamination of a stream of non-conductive, non-electrolyte liquid material by a free electrolyte liquid which includes, in combination, a conduit adapted to carry a stream of non-conductive, non-electrolyte liquid which may be contaminated with electrolyte liquid, a probe extending into said conduit having a metal member disposed in the conduit of a metal dissimilar from the metal of said conduit, a sensitive relay having an actuating winding connected directly to said conduit and said metal portion and a set of contacts, means for resetting said sensitive relay, an auxiliary relay having an actuating winding connected in circuit with said set of contacts, said auxiliary relay having a set of relay contacts, and an indicating device connected in circuit with said set of relay contacts.

4. The system of claim 3 wherein said conduit is formed from steel and said metal portion is formed from magnesium.

5. A system for detecting water contamination of a stream of anhydrous, non-conductive, non-electrolyte material which includes, in combination, a conduit adapted to carry a stream of anhydrous, non-conductive, non-electrolyte material which may be contaminated with water, said conduit having an enlarged metal portion, a probe extending into said enlarged portion of the conduit having a metal member disposed in the conduit of a metal dissimilar from the metal of said conduit, a sensitive relay having an actuating winding connected in circuit with said conduit and said metal portion and a set of normally open contacts, means for resetting said sensitive relay, an auxiliary relay having an actuating winding connected in circuit with said set of contacts, said auxiliary relay having a set of normally open relay contacts, an indicating device connected in circuit with said last-mentioned set of relay contacts, said probe including an elongated rod formed from a rigid relatively strong metal, a sleeve formed from relatively weak metal different than the metal of said metal portion, said sleeve fitting over said rod and enclosing one end thereof and having a shoulder formed at the other end thereof, a sleeve of insulating material mounted at the other end of said metal sleeve and having a shoulder complementary to and bearing against the shoulder on said metal sleeve, a housing surrounding said sleeve of insulating material, and a packing nut threaded to said housing to urge said sleeve of insulating material against the shoulder on said metal sleeve, whereby said metal sleeve is maintained in assembled relation on said rod, and means for making an electrical connection to said rod.

6. A system for detecting contamination of a stream of a non-conductive, non-electrolyte liquid by a free electrolyte liquid which includes, in combination, a conduit adapted to carry a stream of a non-conductive, non-electrolyte liquid which may be contaminated with a free electrolyte liquid, said conduit having a metal portion, a probe extending into said metal portion, said probe having a metal member disposed in the conduit of a metal dissimilar from the metal of said conduit, a sensitive relay having an actuating winding connected in circuit with said conduit and said metal portion and a set of contacts, means for resetting said sensitive relay, an auxiliary relay having an actuating winding connected in circuit with said set of contacts, said auxiliary relay having a set of relay contacts, an air-actuated motor valve disposed in said conduit and controlling the flow of said stream of non-conductive, non-electrolyte liquid therethrough, a line supplying air to said valve, a solenoid valve in said air line having an operating winding, and means connecting said operating winding in circuit with said relay contacts of the auxiliary relay.

7. In a system for controlling the flow of a hydrocarbon stream subject to contamination by water, in combination, a metal conduit carrying said stream, an air-actuated motor valve in said conduit and controlling the flow of said stream therethrough, an air line connected to said valve, a solenoid valve in said air line, an enlarged metal portion formed in said conduit, a probe extending into said enlarged portion having a metal member formed from metal dissimilar to the metal of said conduit, and means responsive to a predetermined potential difference between said conduit and said metal member to actuate said solenoid valve, and thus effect closing of said motor valve.

8. In an underground storage system, in combination, a subterranean cavity containing propane, a line extending from said cavity to the surface of the earth to withdraw said propane from storage, a fractionator connected to said line at the surface to separate water from the stored propane, said line having a portion formed from metal, a probe extending into said portion having a metal member of different composition from the metal of said conduit, a relay having an operating winding connected directly to said metal member and said metal portion of the conduit whereby said relay is energized when a predetermined amount of water is present in said propane, and an indicating device connected to said relay.

9. The underground storage system of claim 8 wherein said metal portion of the conduit is formed from steel and said metal member is formed from magnesium.

10. In an underground storage system, in combination, a subterranean cavity for storing a non-conductive, non-electrolyte material, a shaft connecting said cavity to the surface of the earth, a casing suspended in said shaft and extending to a region adjacent the top of said cavity, a tubing string suspended within said casing and extending to a region adjacent the bottom of said cavity, means sealing the top of said shaft, means for pumping water of greater density than the non-conductive, non-electrolyte material stored in said cavern through said tubing string, thereby displacing a lighter non-conductive, non-electrolyte stored material through said casing to the surface, a line at the surface connecting said casing to a separation system, said separation system separating the stored material from water, said line having an enlarged metal portion, a probe extending into said metal portion including an elongated rod formed from a rigid relatively strong metal, a sleeve fitting over said rod and enclosing one end thereof, said sleeve having a shoulder formed at the other end thereof, a sleeve of insulating material mounted at the other end of said metal sleeve and having a shoulder complementary to and bearing against the shoulder on said metal sleeve, a metal housing surrounding said sleeve of insulating material, and a packing nut threaded to said housing to urge said sleeve of insulating material against the shoulder on said metal sleeve, whereby said metal sleeve is maintained in assembled relation on said rod, means for making an electrical connection to said rod, relay means having a winding connected in circuit with the metal portion of said line and said metal sleeve, whereby said relay means is energized when a predetermined amount of water is present in said line, means actuated by said relay means to interrupt the flow of stored material through said line, and an indicator actuated by said relay means.

11. The method of detecting water contamination of a stored material selected from the group consisting of hydrocarbons and ammonia which comprises withdrawing said material from an underground storage facility wherein it is subject to contamination by water, passing the withdrawn material through a metal conduit in contact with a probe formed from a different metal insulated from said conduit, and producing an output representative of the voltage appearing between said probe and said conduit.

12. The method of detecting water contamination of a stored material selected from the group consisting of hydrocarbons and ammonia which comprises displacing said material from an underground storage facility with a displacement medium, passing the displaced material through a metal conduit in contact with a probe of a metal different from said conduit and insulated therefrom, producing an output representative of the electrical voltage between said conduit and said probe, and stopping the flow of said displacement medium when said voltage rises above a predetermined amplitude.

13. The method of claim 12 wherein the conduit metal is steel and the probe metal is magnesium.

References Cited in the file of this patent

UNITED STATES PATENTS

| | | |
|---|---|---|
| 1,089,030 | Angell | Mar. 3, 1914 |
| 1,774,319 | Crockatt | Aug. 26, 1930 |
| 2,272,914 | Keeler | Feb. 10, 1942 |
| 2,560,209 | Borell et al. | July 10, 1951 |
| 2,593,252 | Booth | Apr. 15, 1952 |
| 2,632,308 | Engelhardt | Mar. 24, 1953 |

FOREIGN PATENTS

| | | |
|---|---|---|
| 566,048 | Germany | Dec. 9, 1932 |